(12) United States Patent
Pienta et al.

(10) Patent No.: US 8,506,736 B1
(45) Date of Patent: Aug. 13, 2013

(54) CORE JOINER AND CUTTER APPARATUS

(71) Applicant: Automatic Handling, Inc., Erie, MI (US)

(72) Inventors: Daniel J. Pienta, Lambertville, MI (US); David M. Pienta, Lambertville, MI (US)

(73) Assignee: Automatic Handling Intl., Erie, MI (US)

( * ) Notice: Subject to any disclaimer, the term of this patent is extended or adjusted under 35 U.S.C. 154(b) by 0 days.

(21) Appl. No.: 13/769,623

(22) Filed: Feb. 18, 2013

Related U.S. Application Data

(62) Division of application No. 12/925,084, filed on Oct. 13, 2010, now Pat. No. 8,444,794.

(51) Int. Cl.
*B31C 11/00* (2006.01)

(52) U.S. Cl.
USPC .......... 156/94; 156/153; 156/257; 156/304.5; 156/304.2; 493/276; 493/286; 493/269; 493/270; 409/64; 409/234; 83/23

(58) Field of Classification Search
USPC ............... 156/257, 94, 304.2, 304.5; 409/64, 409/234; 493/276, 286, 269, 270; 82/23
See application file for complete search history.

(56) References Cited

U.S. PATENT DOCUMENTS 6,706,133 B1 * 3/2004 Erkkila ........................... 156/94

* cited by examiner

*Primary Examiner* — Jeff Aftergut
*Assistant Examiner* — Jaeyun Lee
(74) *Attorney, Agent, or Firm* — Emch, Schaffer, Schaub & Porcello Co., LPA

(57) ABSTRACT

An automatic core joiner and cutter apparatus for use in the recycling of used cores and the manufacture of new conjoined cores is disclosed. The apparatus combines an infeed unit, a milling unit, and an outfeed unit, all controlled by a PC. The used core is milled by the infeed milling bit and the core remnant is milled by the outfeed milling bit. A glue applicator applies glue to at least one of the milled surfaces and the milled surfaces are mated together to produce a new conjoined core. The infeed cutting and milling operations and the outfeed cutting and milling operations are controlled by the controller and performed at the same time.

4 Claims, 15 Drawing Sheets

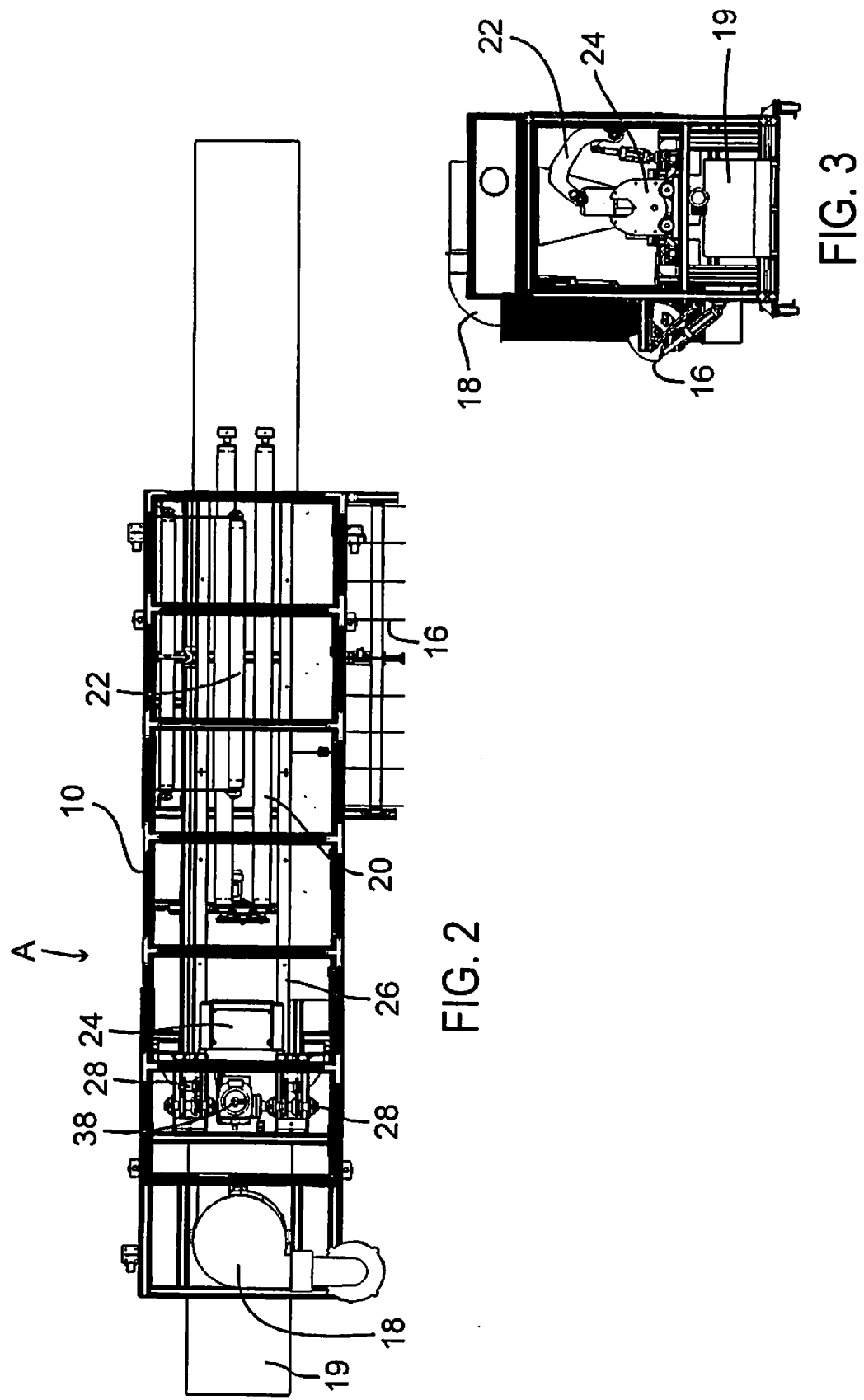

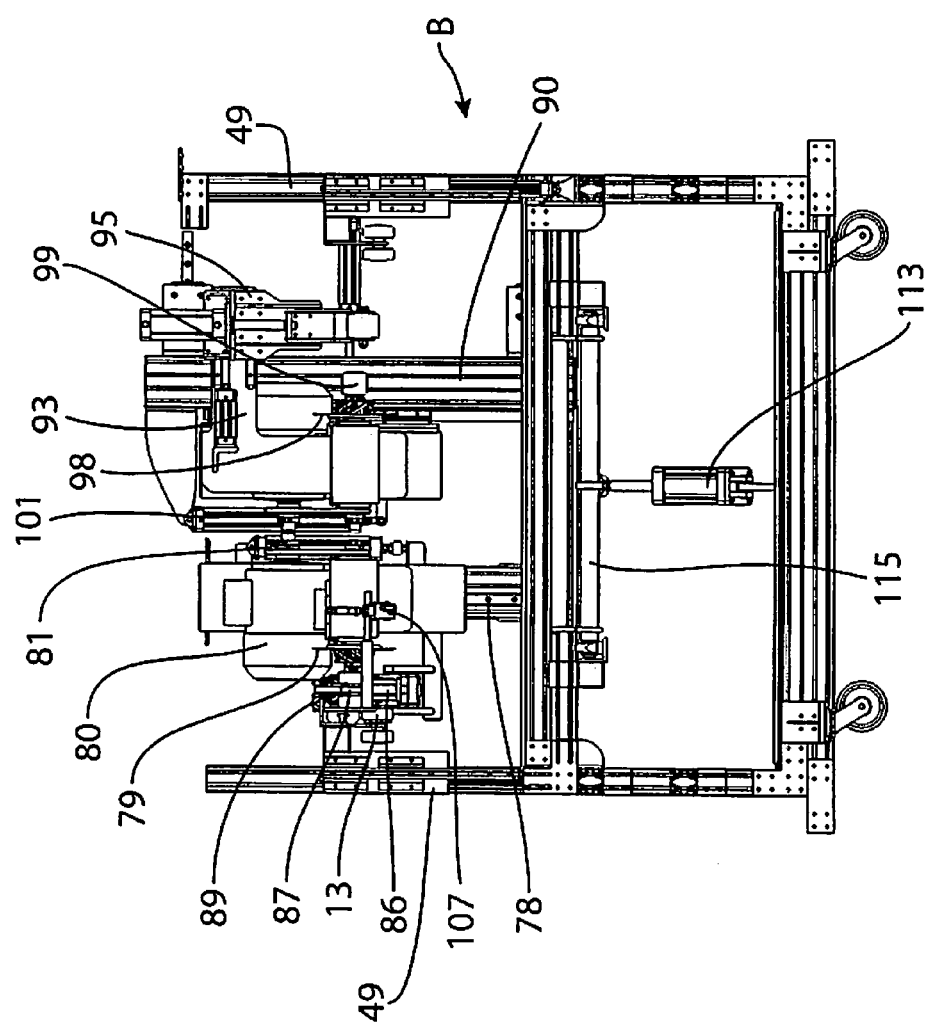

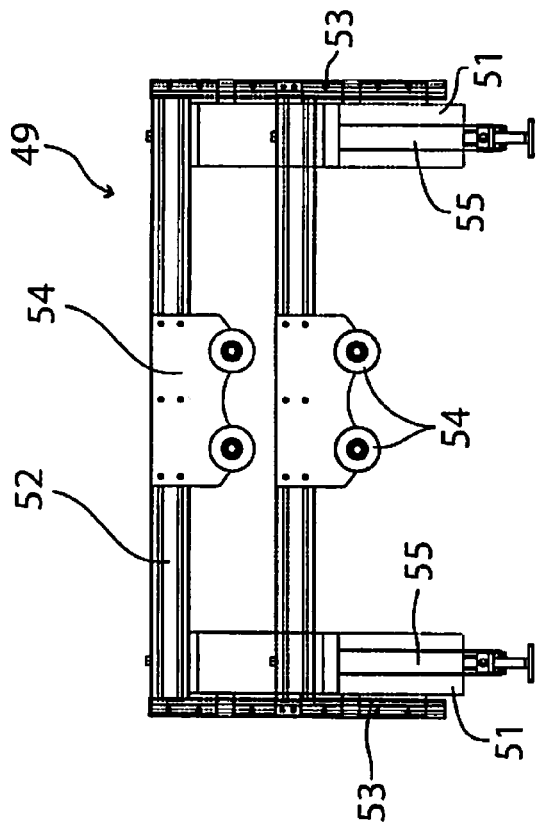
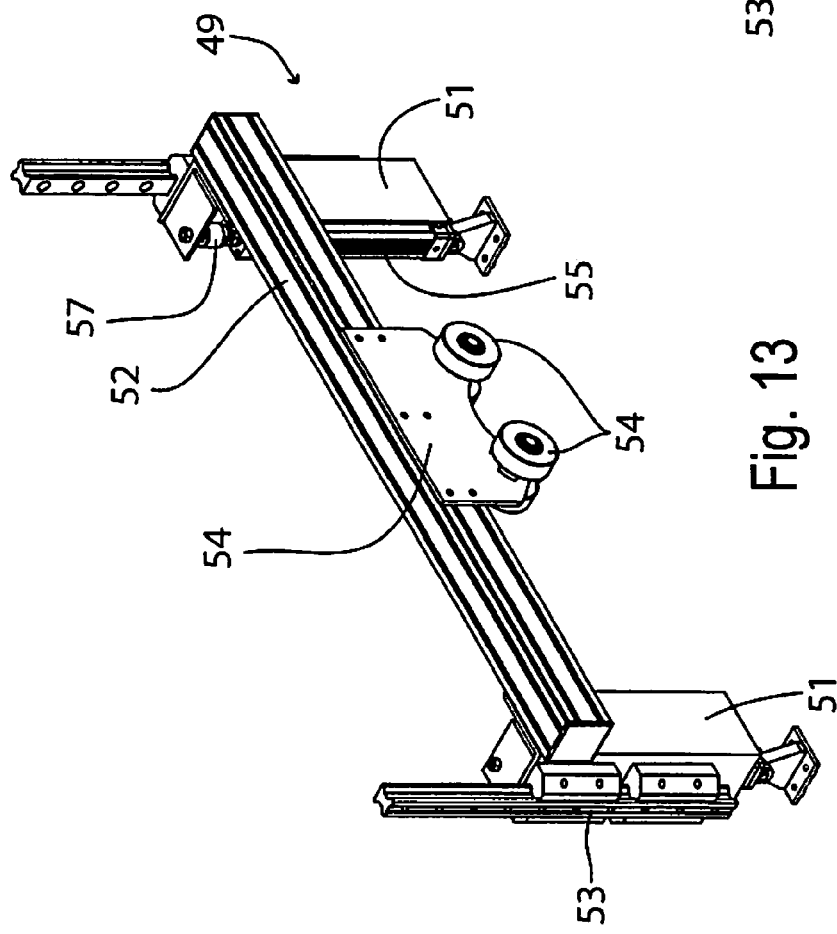
Fig. 14
Fig. 13

CORE JOINER AND CUTTER APPARATUS

CROSS-REFERENCE TO RELATED APPLICATION

This application is divisional of Ser. No. 12/925,084 filed on Oct. 13, 2010, which is now patented as U.S. Pat. No. 8,444,794.

BACKGROUND OF THE INVENTION

The present invention relates generally to the manufacture of paper roll cores designed for use in carrying continuous paper webbing rolled about the core member. More precisely, the invention provides an apparatus for use in the manufacture and recycling of paper roll cores cut to predetermined lengths to match the width of the paper web being wound about the core.

In the paper processing industries, raw material paper webbing is provided for use and is wound on paper roll cores. The wound paper roll core comes in all lengths and sizes and can weigh up to 8,000 lbs. The rolls are commonly transported by industrial crane such as overhead cranes. The cores receive chucks or plugs which are inserted into each end of the core to allow for the roll of raw material paper webbing to be engaged by a crane and transported, for instance, to an unwind machine for further processing. It is desirable to use paper roll cores many times to wind and unwind raw paper material. However, the plugging and transporting operation has a tendency to damage the ends of the paper roll cores, rendering the cores unusable. If the used core is not reusable the manufacturer incurs extensive problems with waste control and costs. If the damaged ends of the core are removed, the core becomes of a different length and is unusable. Thus a need exists for a reliable method to relengthen the core through the addition of a desired length of materials to the shortened core.

U.S. Pat. No. 6,706,133 provides an example of a proposed solution for joining the ends of cores such that the core ends are reworked to provide a straighter joined core with a cross-section of true roundness. The apparatus provides a clamp sleeve for receiving a first core section and a mandrel sleeve for receiving a second core section. The clamp sleeve is movable with regard to the center axis of the mandrel sleeve and guides are in place to force the movement of the clamp sleeve to occur coaxially with regard to the center axis of the mandrel sleeve. The ends of the core sections to be joined are worked with machining tools carried by the clamp sleeve. The machining tools rotate about the ends of the first and second core members providing machined female and male edges. After the ends of the first and second core members are machined, glue is applied to the mating surface and the clamp sleeve moves the first core member into a conjoined position with the second core member. The clamp sleeve then applies a radial pressure to the joint to secure the joining of the two core members.

The present invention provides an improvement over the apparatus shown in U.S. Pat. No. 6,706,133. The present invention provides an automatic core joining and cutting machine that will automatically rework and join the ends of used cores and further automatically cut the conjoined new core to a predetermined length desired by the operator for matching the width of the paper webbing raw material to be rolled onto the new conjoined core member.

BRIEF DESCRIPTION OF THE INVENTION

The core joiner and cutter apparatus of this invention is presented as three distinct units: an infeed unit, a milling unit, and an outfeed unit. The infeed and outfeed units each include pairs of rollers to support a used core member and a pusher bar for moving the used core into and out of contact with the milling unit. The milling unit includes a pair of rollers, at least one milling head, including an infeed cutter, an infeed milling bit, an outfeed cutter and an outfeed milling bit.

To begin operation, a used core member is positioned on the roller members on the infeed unit. The roller members may or may not be driven. The core member is pushed along the roller members toward the milling unit by a pusher bar, driven by a variable frequency drive motor. Torque control is utilized with the drive motor to monitor the force being exerted by the pusher bar. An absolute linear distance sensor is used to monitor the distance the pusher bar is driven. The linear distance sensor provides for linear measurements as to how far the core member is traveling to help determine the precise length of the core member. Positioned in parallel with the rollers is a hold down bar with a roller intended to engage the core member. The hold down bar keeps the core member in position on the rollers. The roller on the hold down bar may, in some embodiments be powered. Hold down clamps are positioned on each side of the milling unit to clamp the core member in position when the core member is being worked on by the at least one milling head.

After the infeed pusher bar pushes the core member into engagement with the milling unit, the infeed cutter engages the core member at a specified axial distance from the damaged end. The infeed cutter then commences the operation of cutting off the damaged end as the rollers rotate the core member. After the damaged end is removed the core member is moved into engagement with the infeed milling bit wherein an engagement surface is machined onto the clean end of the core member.

Simultaneously, a core remnant is positioned in the outfeed unit. An outfeed pusher bar pushes the core remnant toward the outfeed side of the milling unit. If the end of the core remnant is clean and not damaged, the end is engaged with the outfeed milling bit and an engagement surface is machined into the end. If the end of the core remnant is damaged the outfeed cutter blade engages with the core remnant to cut the damaged end off and provide a clean end surface for machining by the outfeed milling bit.

The infeed cutting blade, infeed milling bit and outfeed milling bit sequentially rework the ends of each core member and remnant into opposed mating configurations. Glue is applied to the infeed core member's reworked end and the outfeed side pusher bar pushes the outfeed core remnant to engage the infeed core member into a conjoined core member.

The outfeed cutting blade provides for the cutting of the newly joined core member at a precise distance from the core member's free end, thereby automatically providing a finished core member of specific length. Once the finished core member of specific length is complete, the finished core member is removed from the machine. The infeed side pusher bar engages the remaining new core remnant and pushes it toward the outfeed side of the machine. If the remaining core remnant is of sufficient length, it is again cut by the outfeed cutter to provide another core of specified length. If the remaining core remnant is too short to provide another core of specified length, the infeed pusher bar will push the remaining core remnant through the infeed unit. A new used core member is then placed in the infeed unit and the infeed pusher bar pushes it towards the infeed side of the milling unit. The new used core member is now positioned in the infeed unit and the new core remnant is positioned in the outfeed unit. The cutting and milling operations described above can then begin anew.

Preferably, the entire core joining and cutting apparatus is encased in a safety frame and the apparatus is completely controlled by electronic commands and signals through a PLC.

BRIEF DESCRIPTION OF THE DRAWINGS

FIG. 2 is a top view of the infeed unit as used with the present invention.

FIG. 3 is an end view of the infeed unit of FIG. 2.

FIG. 6B is a front view of the milling unit of FIG. 6A.

FIG. 13 is a perspective view of a hold down clamp as used with the present invention.

FIG. 14 is a side view of the hold down clamp of FIG. 13.

DETAILED DESCRIPTION OF THE INVENTION

Figure 1:
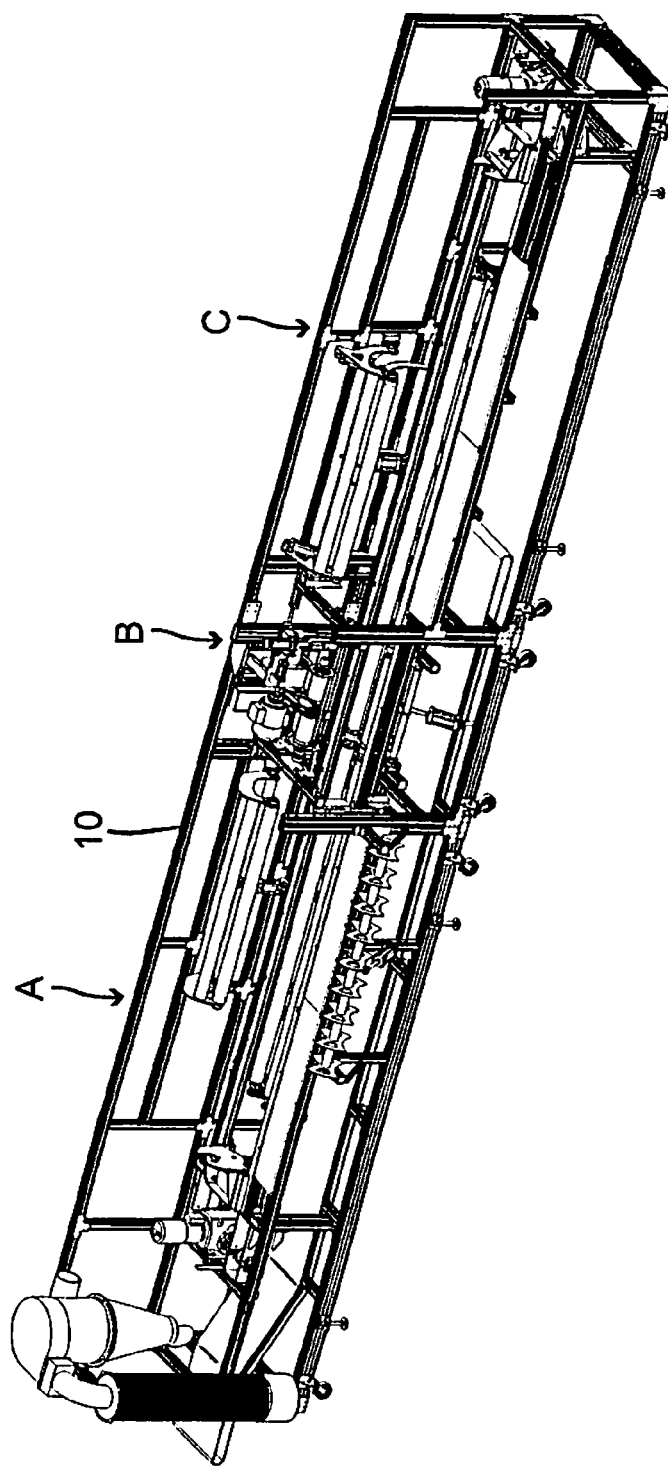
FIG. 1 is a perspective view of the core joiner and cutting apparatus of the present invention with the uppermost portion of the safety frame removed for clarity of viewing.

Referring now to FIG. 1 the core joining and cutting apparatus of the present invention is shown. The apparatus includes a safety frame 10 which encapsulates the active machinery for safety reasons. The safety frame 10 preferably includes plexi-glass panels which completely enclose the machinery. For the purposes of clarity in FIG. 1, the top frame structure of the safety frame 10 has been removed to better enable viewing of the machinery components.

The apparatus of the invention, as shown in FIG. 1, includes an infeed unit A, milling unit B and outfeed unit C.

Referring now to FIGS. 2 and 3, the infeed side A of the apparatus includes a core singulator 16 which receives used cores from a storage or stacking area (not shown) and inserts the cores into the machine through a door (not shown) in the safety frame 10. The used core rests upon motor driven infeed rollers 20. A hold down mechanism 22 engages the core to ensure the core remains fixed in place between rollers 20 and hold down 22. An infeed pusher bar 24 engages one end of the used core and is used to place the opposed end of the core in position proximate the milling unit B. The pusher bar 24 is positioned on rails 26 and is driven by a variable frequency drive motor 38 through a chain drive 28. Torque control is utilized through the motor 38 and a distance sensor measures the linear movement imparted to the pusher bar 24. The distance sensor sends signals to the electronic control or PLC (not shown) which then are used to calculate the length of the core member. Also included in the infeed unit A is a vacuum and filter unit 18 and a trash conveyor 19.

Figure 4:
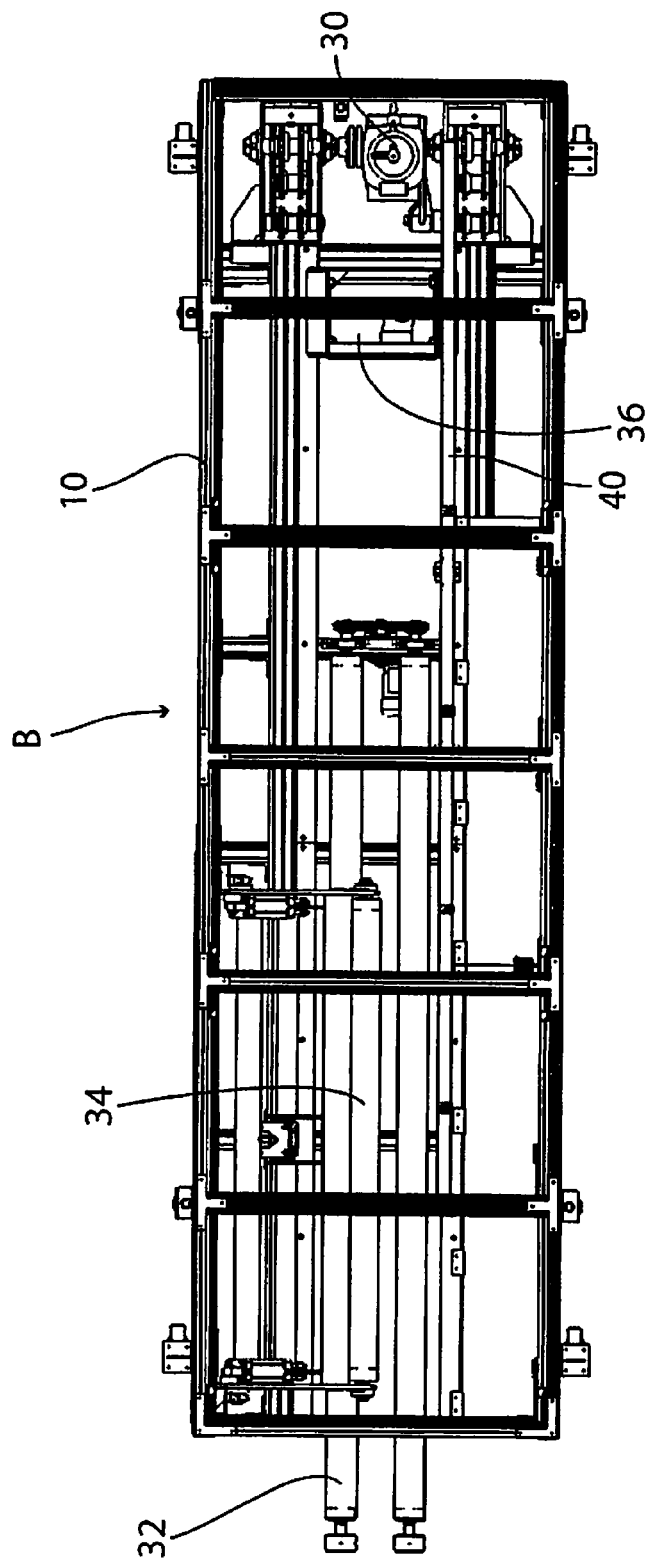
FIG. 4 is a top view of the outfeed unit of the present invention.
Figure 5:
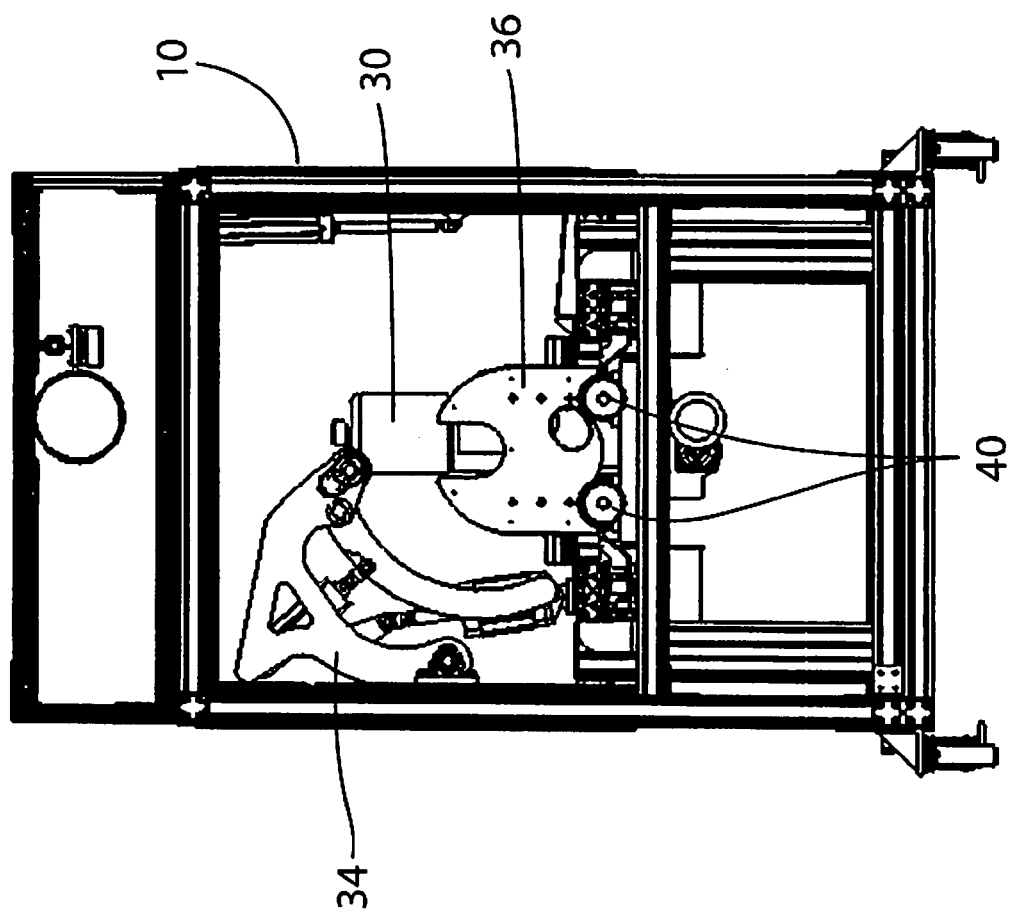
FIG. 5 is an end view of the outfeed unit of FIG. 4.

Referring now to FIGS. 4 and 5, the outfeed side C of the apparatus carries the core remnant that has been previously machined by the milling unit B and joined and cut and is left over. The outfeed side C includes motor driven outfeed rollers 32 and outfeed hold down and kicker bar 34. The outfeed side C further includes an outfeed pusher bar 36 driven by variable frequency drive motor 30. Torque control is utilized through the motor 30 and an absolute linear distance sensor measures the linear movement imparted to the pusher bar 36. The pusher bar 36 is positioned on rails 40 and will engage the distal end of the core remnant and push the core remnant to a position proximate the milling unit B. The length of the core remnant is calculated from measurements taken by the linear distance sensor of the distance traveled by the pusher bar.

Figure 6A:
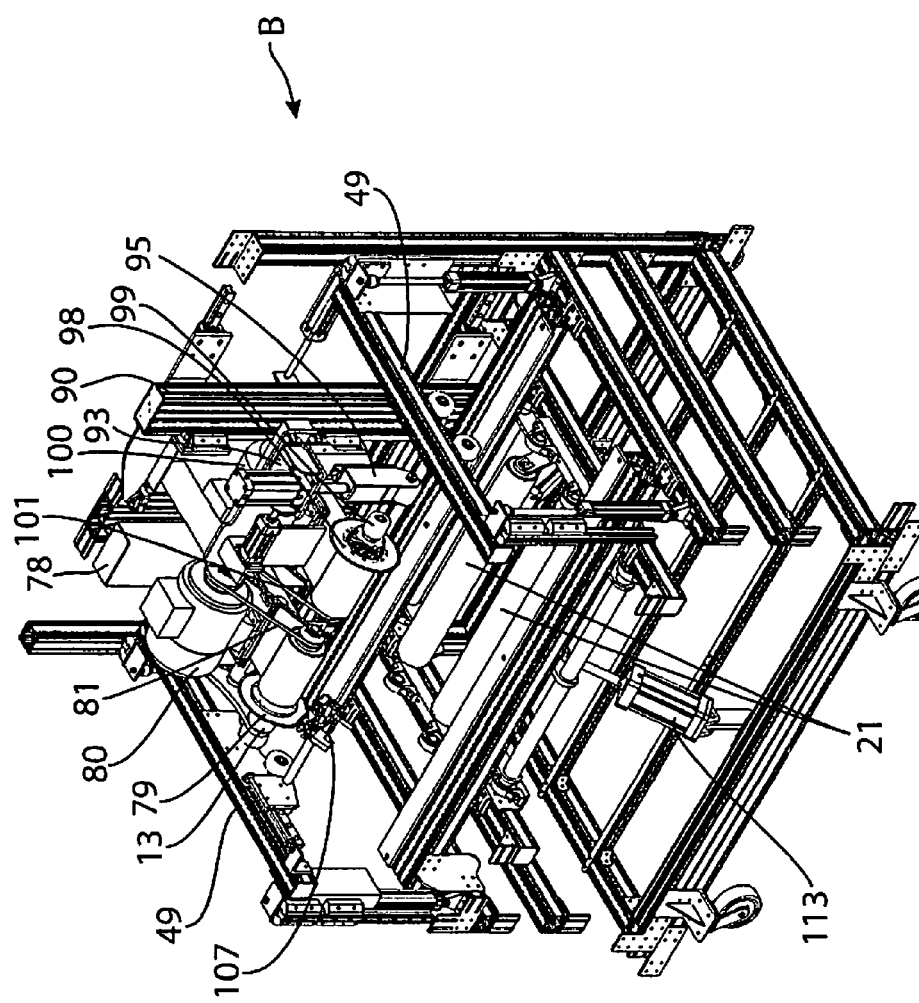
FIG. 6A is a perspective view of the milling unit of the present invention.

Referring now to FIGS. 6A and 6B the milling unit B includes rollers 21 for supporting the used core and core remnant and core clamps 49 for maintaining the used core and core remnant in position as they are being machined. The milling unit B also includes an infeed cutter and milling head and an outfeed cutter and milling head. The infeed cutter and milling head includes a cutting blade 79 driven by drive motor 80 through belt 81. The infeed cutting blade 79 is mounted on a vertical slide 78 that allows for the cutting blade 79 to be moved into and out of engagement with the end of the used core. The infeed milling bit 13 is attached to a servo cylinder 86 that automatically positions the depth of the infeed cutting blade 79. The servo cylinder 86 then provides an automatic adjustment of the cutting blade 79 to accommodate cores of varying diameters and wall thicknesses based upon signals received from the PLC. The outfeed cutting blade 98 and milling bit 117 is driven by drive motor 100 through belt 101. The drive motor 100 and belt 101, cutting blade 98 and milling bit 117 are mounted on a vertical slide 90 for movement of the cutting blade 98 into and out of engagement with the surface of the core remnant. A horizontal slide 93 is provided to allow the milling bit 117 to move around the end of the core remnant and position itself inside the core remnant. A tracker assembly 95 senses the exterior surface of the core remnant and uses air cylinder 87 to extend the milling bit 117 clear of the end of the core remnant and return the milling bit 117 into engagement with the interior surface of the core remnant.

Further attached to the frame of the milling unit is the glue applicator 107 which includes a sensor for determining the surface of the milled end of the used core and a sensor for determining the complete application of glue to the milled surface of the used core. A glue applicator support roller 115 is located beneath the core and includes a piston and cylinder assembly 113 that extends to place the glue support roller 115 into contact with the outside surface of the used core and the core remnant as they are pushed into a mating and conjoined relationship.

Figure 7:
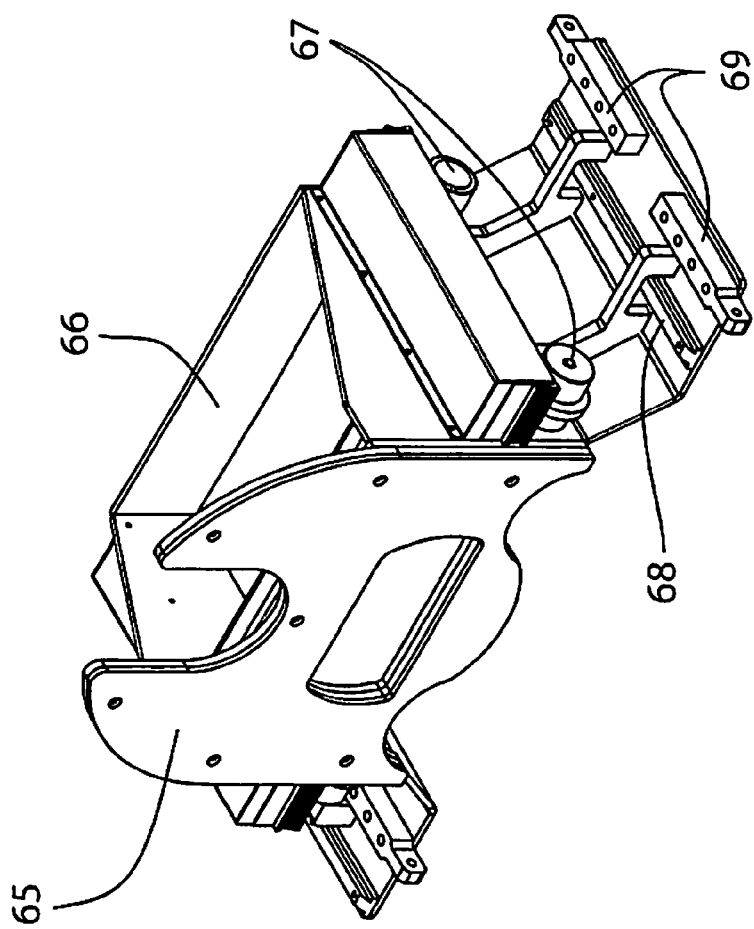
FIG. 7 is a perspective view of a pusher bar as used with the present invention.
Figure 8:
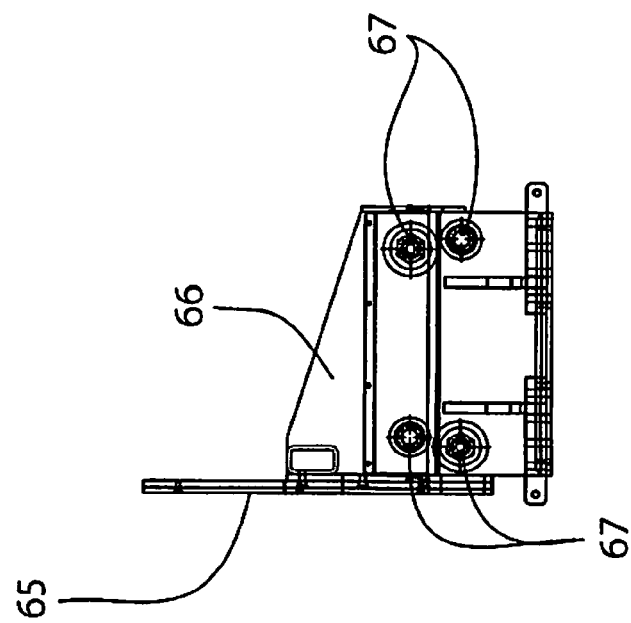
FIG. 8 is a side view of the pusher bar of FIG. 7.

Referring now to FIGS. 7 and 8, the pusher bar 24 as used on both the infeed unit A and outfeed unit C is shown in detail. The pusher bar 24 includes a pusher head 65 engaged to a frame 66. The frame carries cam followers 67 for engagement with the rails 26. Further engaged with the frame 66 are chain connectors 68 designed to engage the drive chain to provide movement for the pusher bar 24. Wear bars 69 are provided to prevent undo wearing of the chain and pusher frame chain connector engagement.

Figure 9:
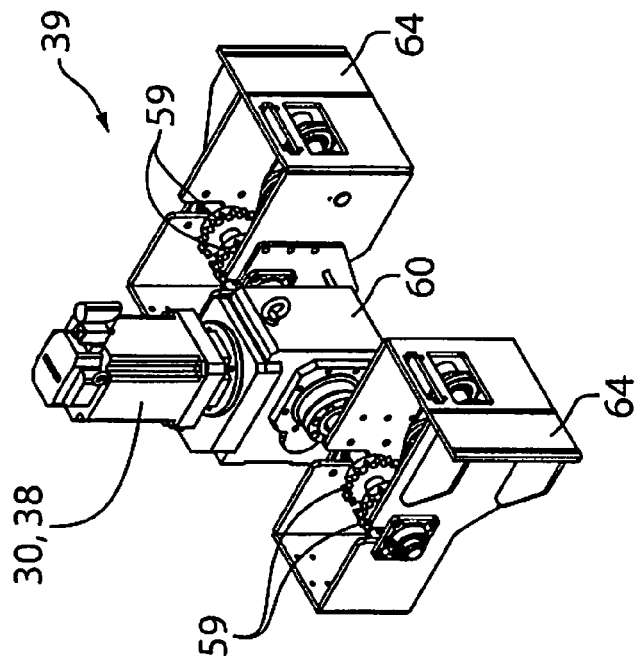
FIG. 9 is a perspective view of the automatic take up frame as used with the present invention.
Figure 10:
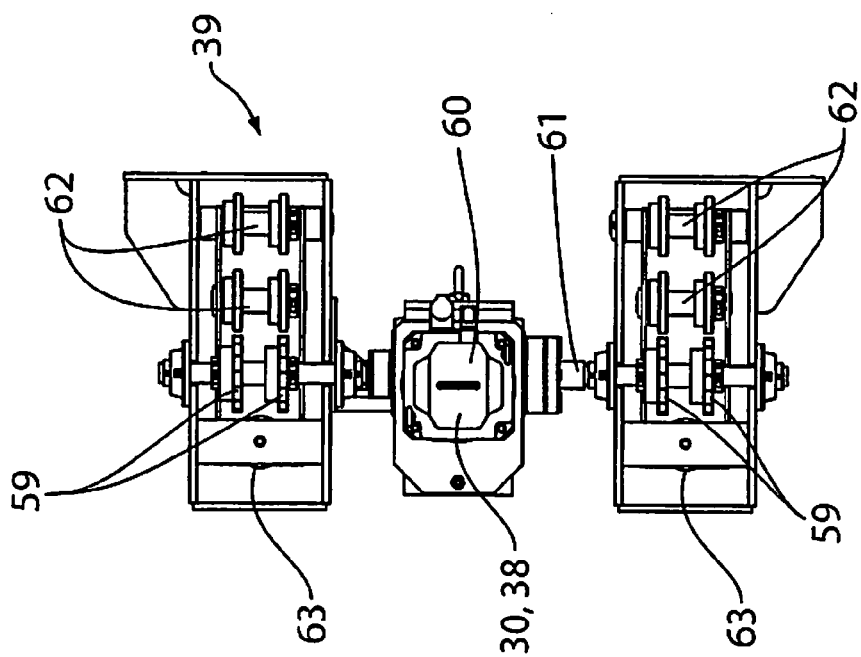
FIG. 10 is a bottom view of the automatic take up frame of FIG. 9.

Referring now to FIGS. 9 and 10, the automatic take up frame 39 for the pusher bar is shown in detail. There is an automatic take up frame positioned on both the infeed unit A and the outfeed unit C. The automatic take up frame 39 includes a variable frequency drive motor 30, 38 engaged to gear sprockets 59 by means of gear box 60 and drive shaft 61. The gear sprockets 59 engage a chain drive (not shown) which in turn is engaged with the pusher bar 24, 36. Preferably the motor 38 on the outfeed unit C controls pusher bar 24 on the infeed unit A and motor 30 on the infeed unit A controls pusher bar 36 on the outfeed unit C. Operation of the variable drive motor 30, 38 motivates the chain drive to move the pusher bar 36, 24 into and out of engagement with the core segments. A take up mechanism for removing slack from the chain drives includes a pair of idler rollers 62 engaged with an air stroke actuator 63. The idler rollers are moved by the air stroke actuator 63 to engage the chain drive and remove slack therefrom. The automatic take up frame 39 is mounted on the core joiner frame through mounting brackets 64.

Figure 12:
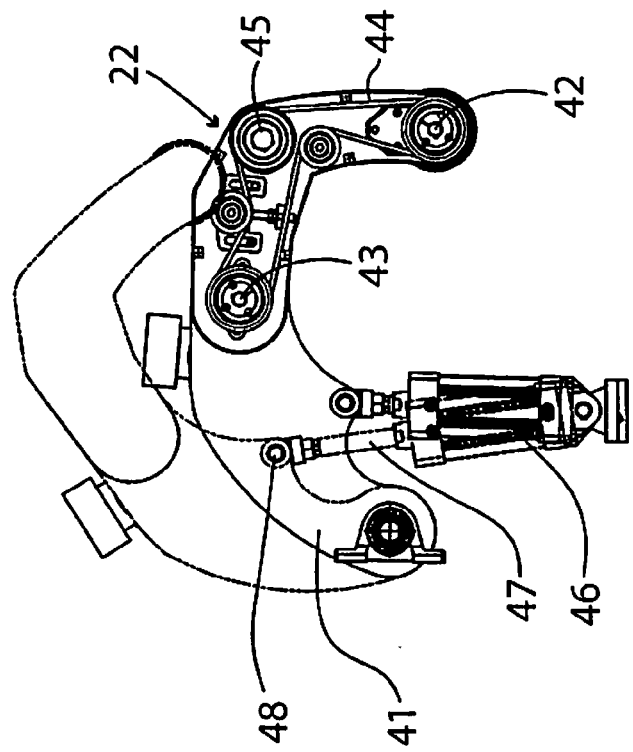
FIG. 12 is a side view of the hold down bar of FIG. 11 showing the optional drive mechanism for the hold down roller.
Figure 11:
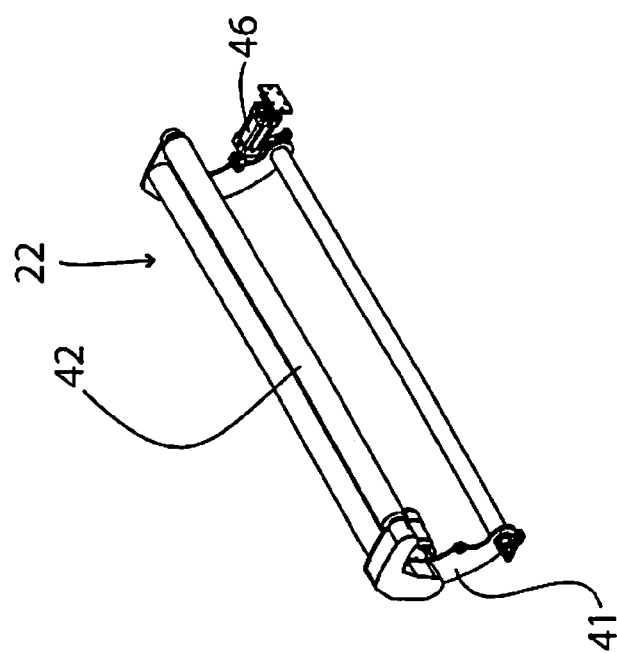
FIG. 11 is a perspective view of the hold down bar of the infeed unit as used with the present invention.

Referring now to FIGS. 11 and 12 the hold down mechanism 22 that is used on the infeed unit A is shown in detail. The hold down mechanism 22 includes a frame 41 mounted on the core joiner frame, carrying roller 42. In some embodiments, roller 42 is not powered. In the embodiment shown in FIGS. 11 and 12, the roller 42 is powered and is engaged to a motor 43 through a drive belt 44 that in turn is carried by a series of idler sprockets 45 designed to maintain tension in the drive belt 44. A pneumatic cylinder 46 is engaged with the frame 41 by means of a plunger rod 47 and pivot pin 48. As shown in FIG. 12, operation of the pneumatic cylinder extends and retracts the drive roller 42 for engagement with the outside surface of the core.

Referring now to FIGS. 13 and 14, the core clamp 49 is shown in detail. There is a core clamp 49 positioned on both ends of the milling unit B. The core clamp 49 are designed to hold the used core and core remnant in an axially fixed position while they are being rotated and machined by the milling unit B. The core clamp 49 includes a slider bar 52 positioned and mounted on linear bearings 53. A clamp plate 54 is positioned on the slider bar 52 and carries rollers 54 for engagement with the outer surface of the cores. Pneumatic cylinders 55 are positioned on cylinder mounting brackets 51 and are engaged with the slider bar 52 by means of pistons 57. When energized by the pneumatic cylinders 55 the slider bar 52 moves the rollers 54 into and out of engagement with the cores by moving the slider bar 52 up and down the linear bearings 53.

Figure 16:
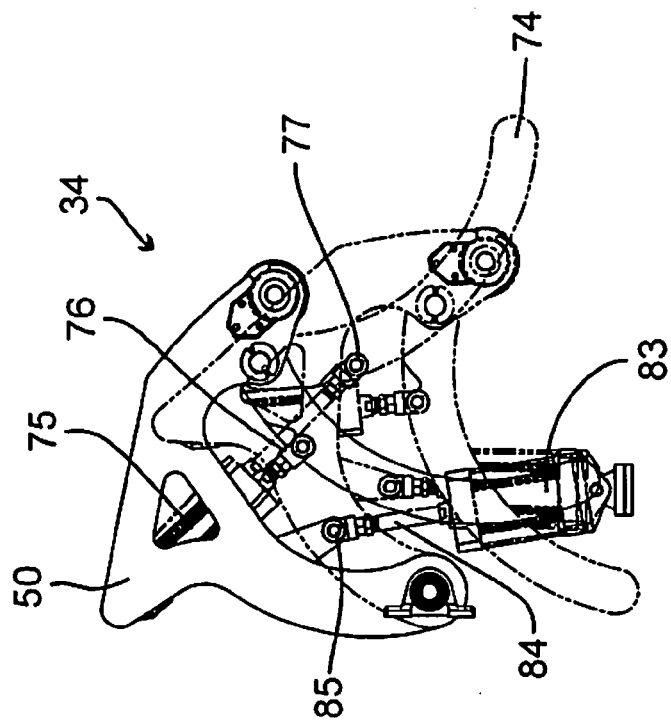
FIG. 16 is a side view of the hold down and kicker bar of FIG. 15.
Figure 15:
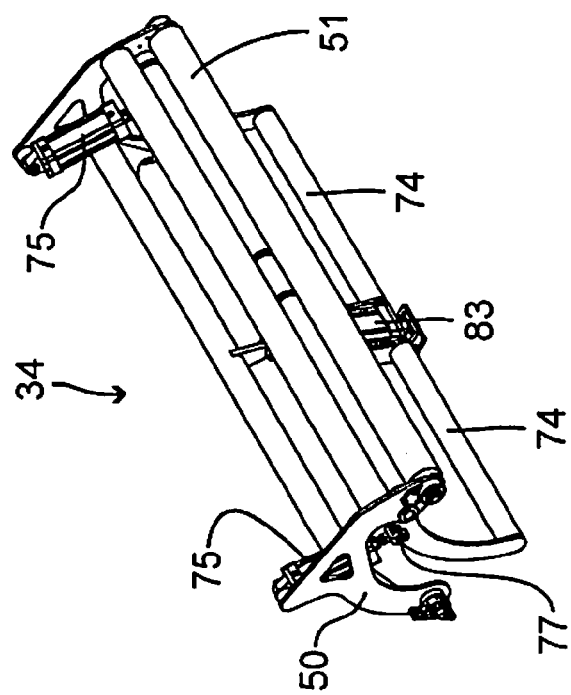
FIG. 15 is a perspective view of the outfeed hold down and kicker bar as used with the present invention.

Referring now to FIGS. 15 and 16, the hold down and kicker bar 34 of the outfeed unit C includes a support frame 50 mounted on the core joiner frame and positioned proximate the outfeed rollers 32. The support frame 50 carries hold down roller 51. A pneumatic cylinder 83 is engaged with the support frame 50 by means of a plunger rod 84 and pivot pin 85. As shown in FIG. 16, when the piston 84 is extended the frame 50 rotates to disengage the hold down roller 51 from the surface of the core remnant. Retraction of plunger rod 84 by cylinder 83 pulls the hold down roller 51 into engagement with the surface of the core remnant. The support frame 50 further carries kicker bars 74, pivotally engaged thereto. Pneumatic cylinders 75 are engaged with the kicker bars 74 via pistons 76 and pivot pins 77. When the pistons 76 are extended from the cylinders 75 the kicker bars 74 rotate about pivot pins 77 to push the new core member from the outfeed unit C for transfer to a core stacking bin (not shown).

Figure 17:
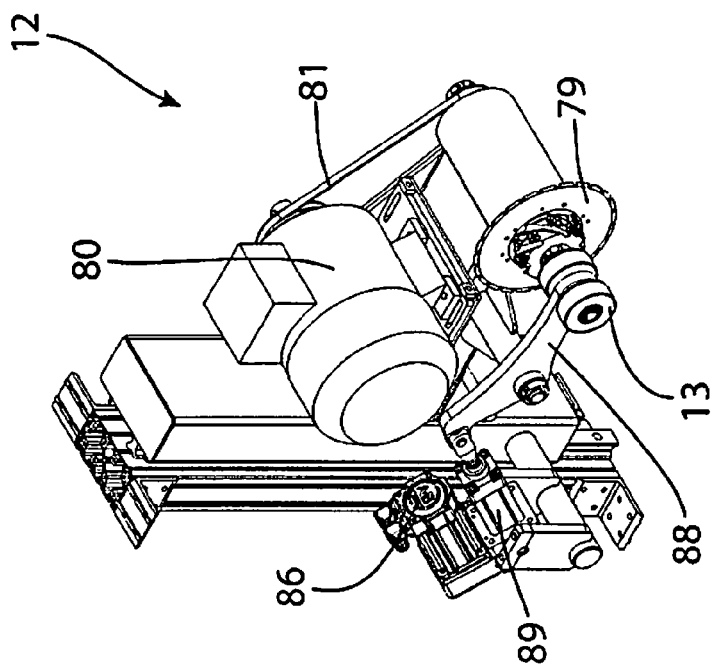
FIG. 17 is a perspective view of the infeed cutter and milling head as used with the present invention.
Figure 18:
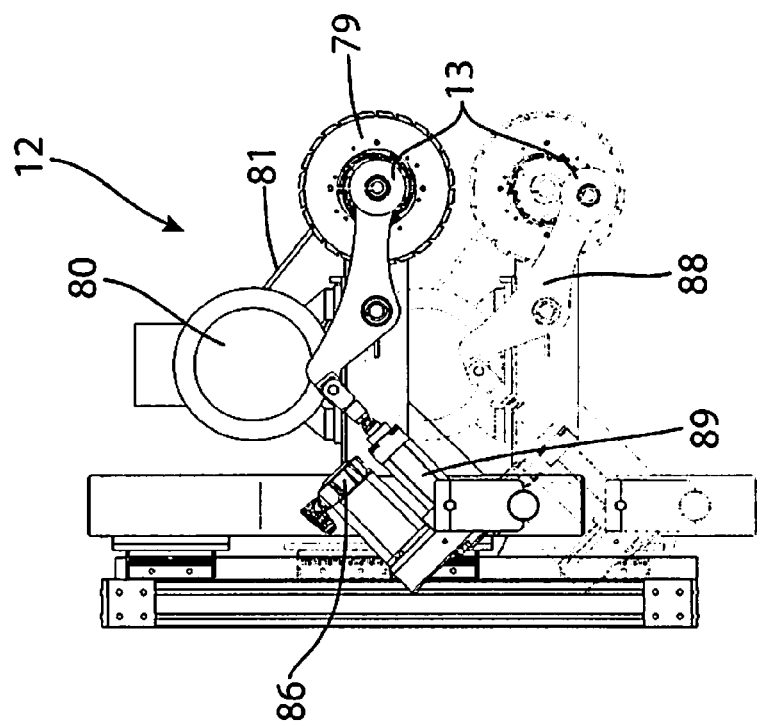
FIG. 18 is a side view of the infeed cutter and milling head of FIG. 17.

Referring now to FIGS. 17 and 18, the infeed cutter and milling head 12 is shown in detail. The cutter portion of the infeed cutter and milling head is mounted for movement on a vertical slide 78. The cutter portion includes cutting blade 79 engaged with a drive motor 80 through belt 81. The used core is rotated by the infeed rollers 20 and the cutting blade 79 is automatically positioned by the servo cylinder 89 to come into engagement with the outer surface of the used core, thereby enabling the cutting blade 79 to cut off the damaged end which drops onto the trash conveyor 19 (FIG. 2). The infeed milling bit 13 is engaged with a pneumatic cylinder 89 by means of a pivot arm 88. After the cutting blade 79 has removed the damaged end of the used core the servo cylinder 89 extends to place the milling bit 13 into engagement with the newly cut end of the used core. The servo cylinder 89 provides depth control for the milling bit 13, enabling it to mill a smooth mating surface on the end of the used core.

Figure 19:
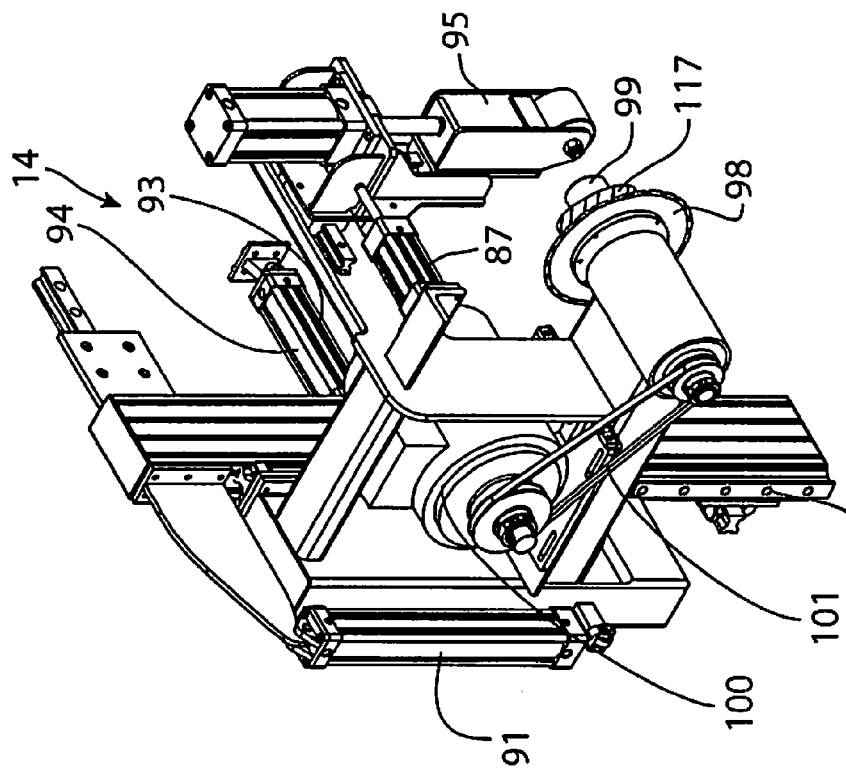
FIG. 19 is a perspective view of the outfeed cutter and milling head as used with the present invention.
Figure 20:
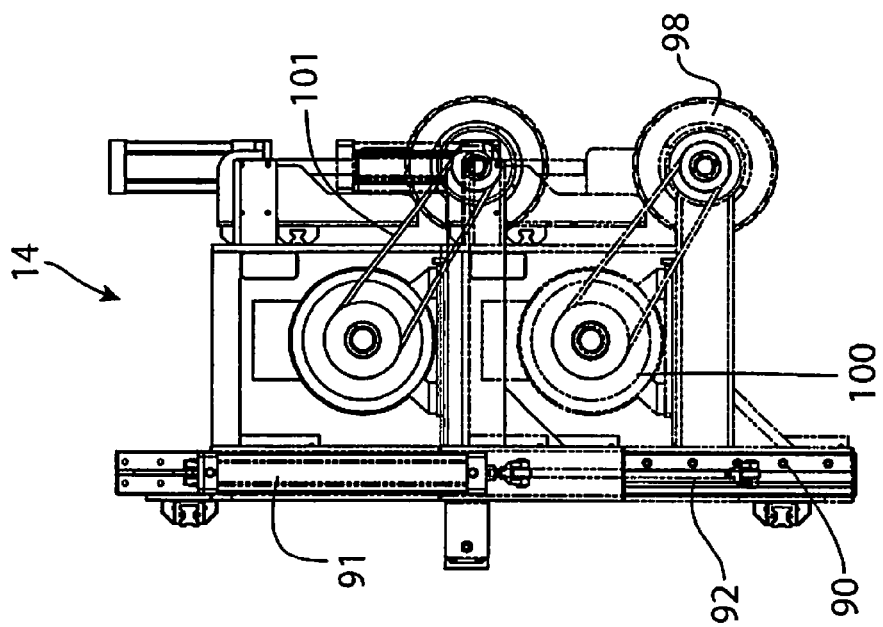
FIG. 20 is a side view of the outfeed cutter and milling head of FIG. 19.

Referring now to FIGS. 19 and 20, the outfeed cutting tool and milling head 14 is shown in detail. The outfeed cutting tool and milling head is designed for movement in both the vertical and horizontal direction with respect to the core remnant. The outfeed cutting tool and milling head performs operations on the core remnant that is positioned in the outfeed unit C. The outfeed cutting tool and milling head moves vertically on slide 90 by means of cylinder 91 and piston 92 combination. The outfeed cutting tool and milling head 14 moves horizontally with respect to the core remnant on slide 93 through motion imparted by cylinder 94. Tracking assembly 95, designed to sense and engage the outer surface of the core remnant uses an air cylinder 94 to extend the milling bit 117 past the end of the core remnant. The milling bit 117 is then moved vertically and moves into the interior of the core remnant. The cutting and milling head 14 includes cutting blade 98 and mill bit 117 driven by drive motor 100 through belt 101. The core remnant is rotated by the outfeed rollers 32 and the cutting blade 98 cuts off the damaged end which drops onto the trash conveyor 19 (FIG. 3). After the cutting blade 98 has removed the damaged end of the core remnant, the cutting and milling head 14 is moved horizontally by air cylinder 94 with respect to the end of the core remnant to a position wherein the milling bit 117 can safely clear the core remnant's clean end for placement into the interior of the core remnant. The milling and cutting head 14 is lowered vertically on slide 90 to place the milling bit 117 into the interior of the core remnant and then is moved horizontally to place the milling bit 117 into engagement with the interior surface of the clean end of the core remnant. A mating surface is then milled into the inside surface of the new clean end of the core remnant, using wheel 99 as a guide to determine the depth of the cut.

Figure 22:
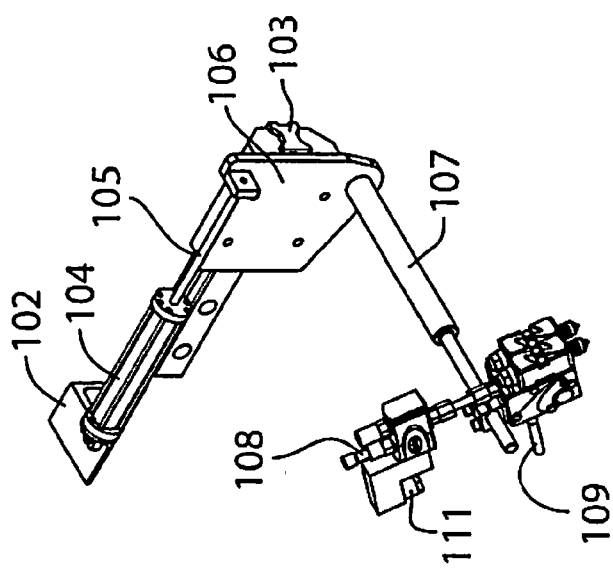
FIG. 22 is a perspective view of the glue application apparatus of FIG. 21.
Figure 21:
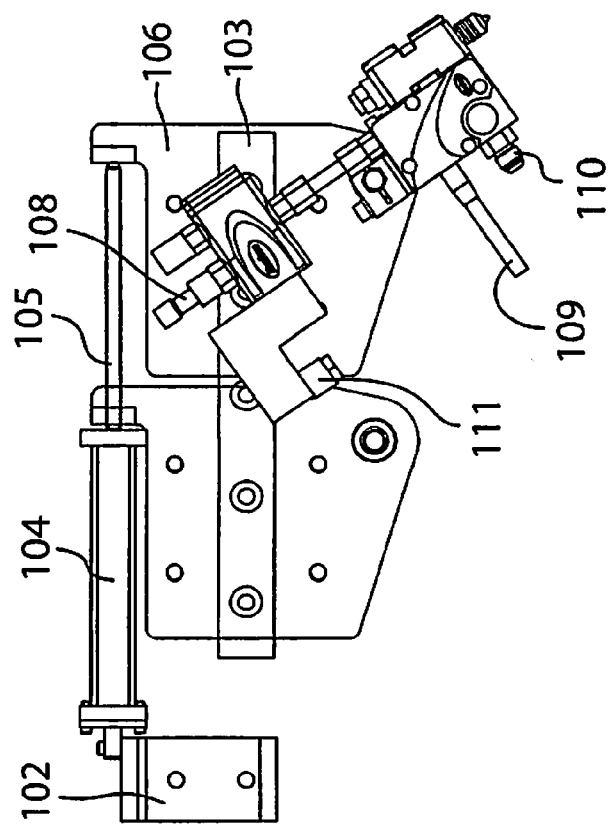
FIG. 21 is a side view of the glue application apparatus as used with the present invention.

Referring now to FIGS. 21 and 22, the automatic glue applicator is shown in detail. The applicator is mounted on the core joiner frame by bracket 102 and slide 103. A cylinder 104 and piston 105 combination is engaged between the bracket 102 and the applicator mounting plate 106. The applicator 107 is fixed on the applicator mounting plate 106 by piston 105. The glue applicator 107 includes a valve 108 intended for engagement with a hose (not shown) which feeds glue to the applicator 107. The applicator (107) further includes an application nozzle 109 and sensor 110 for sensing the surface of the milled end of the used core. A second sensor 112 monitors the application of glue to the milled end of the used core as the used core is turned by the infeed rollers 20 and discontinues the flow of glue when the entire circumference of the milled end of the used core has received glue.

Figure 24:
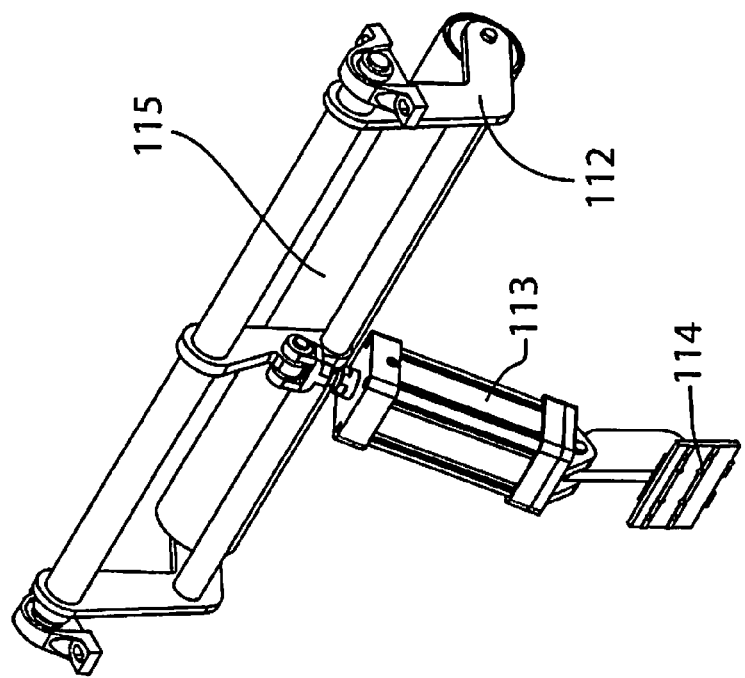
FIG. 24 is a side view of the glue support operation roller of FIG. 23.
Figure 23:
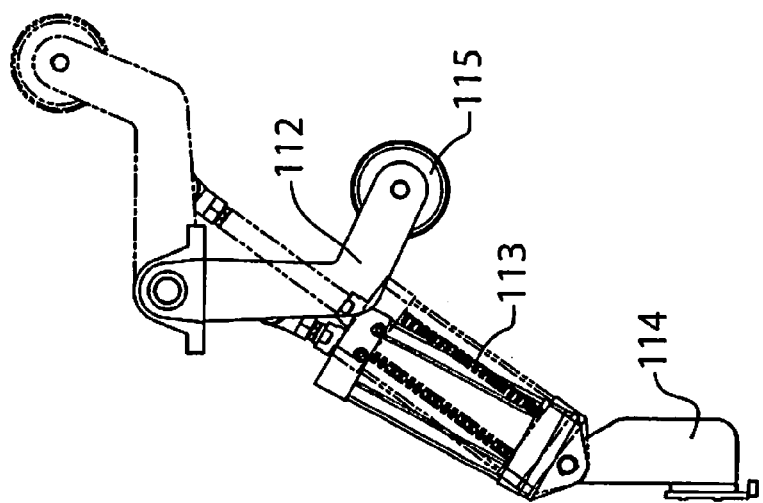
FIG. 23 is a perspective view of the glue operation support roller as used with the present invention.

Referring now to FIGS. 23 and 24 the glue application support roll is shown in detail. The glue application support roll includes a frame 112 engaged with the core joiner frame by cylinder and piston combination 113 and bracket 114. The frame carries a coated roller 115. The roller is preferably coated in neoprene or some other coating impervious to the glue being applied to the used core. When the milled used core has received glue and is positioned to be joined with the milled core remnant the cylinder 13 extends its piston and places the roller 115 in contact with the joined core remnants as the core remnants are rotated and pressed together. The roller 115 removes excess glue from the seam of the joined remnants.

The sequence of operation for the core joining and cutting apparatus is as follows. The infeed side A of the apparatus receives a used core from the core singulator 16. The used core is engaged by the pusher bar 24 and pushed toward the infeed cutting and milling head 12. An electronic photo eye (not shown) positioned proximate the infeed cutting and milling head 12 sees the front edge of the used core and signals the PLC to stop movement of the pusher bar 24. The infeed cutting and milling head 12 is moved over the used core end, wherein the infeed cutting blade 79 is moved into engagement with the outer surface of the used core and cuts through the core surface as the used core is rotated by the infeed rollers 20, allowing the damaged end of the used core to be removed. The cutting blade 79 is moved out of engagement with the used core and the infeed milling bit 13 is moved into engagement with the freshly cut end of the used core. The infeed milling bit 13 engages the outer surface of the freshly cut end of the used core and mills the end to a given depth based upon the wall thickness of the core and other variables such as bit wear, etc. The infeed milling bit 13 then disengages from the core and the glue applicator 107 applies glue to the surface of the milled outer surface of the used core. The thermal scanner ensures that the glue has been properly applied to the milled outer surface of the core.

Preferably, at the same time the used core is being worked on at the infeed unit, a core remnant positioned on the outfeed unit of the apparatus is being prepared to receive a milled end. The outfeed cutting blade 98 is moved into engagement with the core remnant outer surface and cuts through the core remnant surface as the core is rotated by the outfeed rollers 32 thus allowing the damaged end of the core remnant to be removed. The outfeed cutting blade 98 is moved out of engagement with the core remnant and the outfeed milling bit 117 is moved into position in the interior of the core remnant. The outfeed milling bit 117 clears the cut edge of the core remnant through movement on slides 90 and 93. The outfeed milling bit then mills the interior surface of the freshly cut end of the core remnant to a given depth based upon the wall thickness of the core and the diameter of the wheel 99. The milled end of the core remnant is then pushed by pusher bar 36 into engagement with the glued surface of the newly milled used core positioned in the infeed side of the milling unit. The force with which the core remnant is pushed to engage the glued milled surface of the used core is dependant upon the wall thickness and size of the core. The PLC sets the force by monitoring the torque measured by motor 30.

The conjoined core is then pushed a specified distance as defined by the linear distance sensor to a position proximate the outfeed cutting blade 98. A new conjoined core of specified length is then cut and removed from the outfeed side of the apparatus. The pusher bar 24 is then driven to push the remaining conjoined core further toward the outfeed side. If the linear distance sensor detects that the remaining conjoined core is long enough to cut and produce a new core of specified length, the pusher bar 24 further to the outfeed side stops and the outfeed cutting blade 98 again cuts the conjoined core. If the remaining conjoined core is of insufficient length to produce a new core of specified length, the pusher bar 24 is driven to push the now new core remnant to a position wherein the opposed uncut end of the new core remnant is adjacent the outfeed cutting blade 98. The infeed side of the apparatus receives a new used core and the simultaneous infeed and outfeed cutting and milling operations start anew. While the preferred sequence of operation is explained herein as simultaneous infeed and outfeed operations, it is acknowledged that the infeed and outfeed operations may also be sequential.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A process for automatically performing cutting and milling operations on a used core and a core remnant to provide mating milled surfaces on the adjacent ends of the used core and core remnant and placing the mating surfaces into engagement with each other to produce a conjoined core, such process including the steps of:
    positioning a used core proximate an infeed cutting blade and infeed milling bit and positioning the adjacent end of a core remnant in a position proximate an outfeed cutting blade and an outfeed milling bit;
    cutting the used end of the used core with the infeed cutting blade to produce a clean end and cutting the used end of the core remnant with the outfeed cutting blade to produce a clean end;
    milling the clean end of the used core with the infeed milling bit to produce a mating surface and milling the clean end of the core remnant with the outfeed milling bit to produce a mating surface;
    applying glue to at least one of the mating surfaces; and
    joining the mating surfaces of the used core and core remnant to produce a conjoined core.

2. The process of claim 1 wherein the outfeed cutter and milling bit are positioned on a vertical slide and a horizontal slide, wherein a controller controls movement of the outfeed milling bit into engagement with the interior surface of the core remnant.

3. The process of claim 1 further including the step of moving the conjoined core a specified distance and cutting the conjoined core with the outfeed cutting blade to produce a new conjoined core member of specified length.

4. The process of claim 1 wherein the used cores are provided in a variety of lengths and resulting conjoined cores are of a variety of lengths and the specified length of the new conjoined core member can vary.

* * * * *